United States Patent [19]

Sienicki et al.

[11] 4,056,842
[45] Nov. 1, 1977

[54] CERAMIC TRIMMER CAPACITOR

[75] Inventors: John W. Sienicki; Clarence A. Haycox, both of Erie, Pa.

[73] Assignee: Erie Technological Products, Inc., Erie, Pa.

[21] Appl. No.: 703,668

[22] Filed: July 8, 1976

[51] Int. Cl.² ............................................... H01G 5/06
[52] U.S. Cl. ..................................... 361/293; 361/278
[58] Field of Search ........................ 317/249 D, 249 R; 361/292, 278, 293

[56] References Cited

U.S. PATENT DOCUMENTS 3,353,074  11/1967  Mittler ............................. 317/249 R

FOREIGN PATENT DOCUMENTS 2,011,884  3/1970  Germany ........................ 317/249 D
545,431  11/1940  United Kingdom ............ 317/249 D
574,596  1/1946  United Kingdom ............ 317/249 D
982,167  2/1965  United Kingdom ............ 317/249 D

*Primary Examiner*—E. A. Goldberg
*Attorney, Agent, or Firm*—Ralph Hammar

[57] ABSTRACT

A rotary disc trimmer in which the rotor and stator leads have heads received in the same socket in the stator and are insulated from each other by a disc of insulating material fixed to the head of the rotor terminal and centered on the rotor shaft.

7 Claims, 6 Drawing Figures

CERAMIC TRIMMER CAPACITOR

This invention is a disc type trimmer which is particularly adapted to trimmers of extremely small size, for example, trimmers having a diameter less than 1/7th of an inch.

Figure 1:
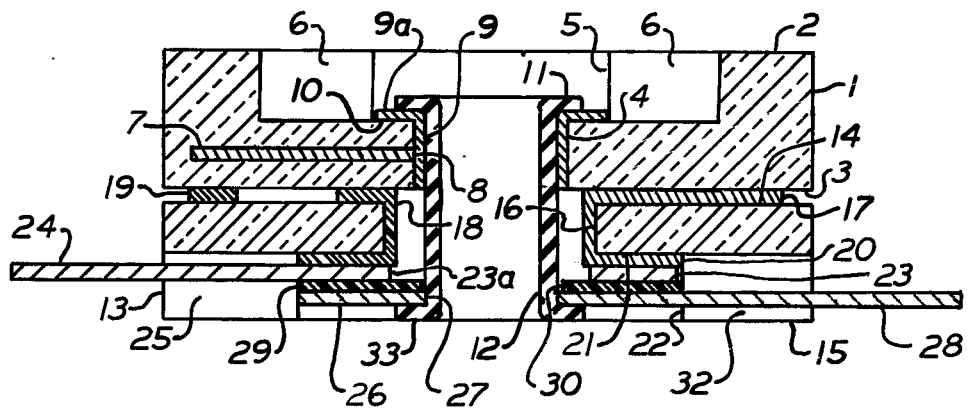
FIG. 1 is an enlarged sectional side elevation of the trimmer.
Figure 2:
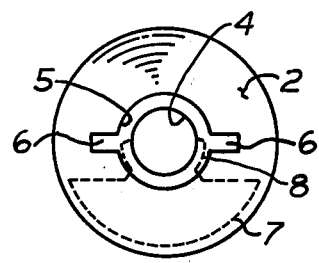
FIG. 2 is a top plan view of the rotor.

The rotor 1 is a disc of suitable insulating material such as a ceramic having top and bottom faces 2, 3 connected by a bore 4 perpendicular to the bottom face. The bottom face of the rotor is flat. In the top face of the rotor is a cylindrical socket 5 concentric with the bore 4. At opposite sides of the socket are grooves or notches 6 for receiving a screwdriver or a similar tool for turning the rotor. Adjacent the bottom face 3 of the rotor is a semicircular electrode 7 having an extension 8 extending to the inner surface of the bore. Electrical connection to the electrode 7 is made through a metallic coating 9 on the bore having an extension 9a to the bottom wall 10 of the socket 5. The coating 9 makes contact with the extension 8 of the electrode 7. The flange 11 of an eyelet 12 makes contact with the extension 9a of the coating 9. The eyelet 12 serves as the rotor shaft.

Figure 3:
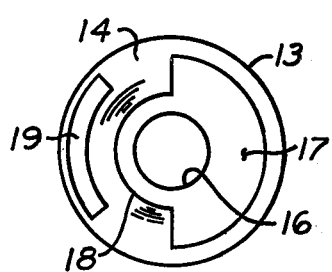
FIG. 3 is a top plan view of the stator.
Figure 4:
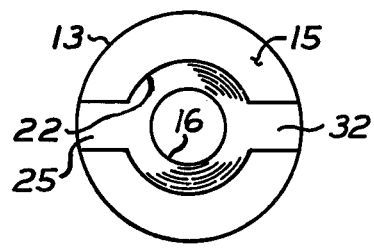
FIG. 4 is a bottom plan view of a stator.

The stator (FIGS. 3, 4) of the trimmer is a disc 13 of ceramic or other suitable insulating material having upper and lower faces 14, 15 connected by a center hole or bore 16 of larger diameter than the bore 4. On the upper or flat surface of the stator is a semicircular electrode 17 having an extension 18 surrounding the bore 16 and a balance pad 19 diametrically opposite the electrode 17. In the minimum capacity position shown the rotor and stator electrodes are diametrically opposite to each other. The electrode 17 and its extension 18 are connected to a metallic coating 20 on the bore 16 and on the top wall 21 of a cylindrical recess 22 extending upwardly from the bottom surface 15.

Figure 5:
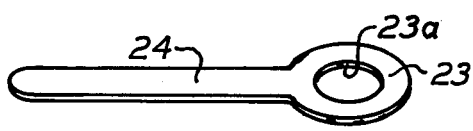
FIG. 5 is a perspective of the stator lead.
Figure 6:
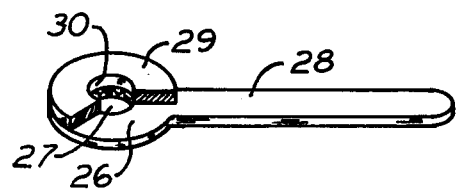
FIG. 6 is a perspective of the rotor lead with the disc of insulating material which insulates the stator and rotor leads partly broken away.

The stator lead or terminal (FIG. 5) is a sheet metal stamping having a flat metal head 23 and a shank 24. The head 23 is telescoped into the cylindrical recess 22 and the shank 24 is received in a groove 25 on the underside of the stator. The head 23 of the stator lead has a center hole 23a which registers with the bore 16 and accordingly is spaced radially outward of the eyelet 12. The rotor lead (FIG. 6) is a sheet metal stamping with a flat head 26 with a center hole 27 and a shank 28. On top of the head 26 is a washer 29 of glass fiber or other insulating material bonded to the upper side of the head and having its center hole 30 registering with the center hole 27 and having its outer edge registering with the outer edge of the head 26. The head and washer assembly 26, 29 has a telescoping fit in the side walls of the socket 22 and over the lower end of the rivet or eyelet. The rotor lead is assembled so that its shank 28 fits in the groove 32. After the stator and rotor leads have been telescoped into the socket 22 and over the lower end of the eyelet 12, the assembly is completed by spinning over the lower end of the eyelet to form a flange 33 which makes electrical contact with the rotor lead and holds the stator and rotor in assembled position.

The rotor and stator leads have heads carried in the same socket 22 in the stator and insulated from each other by the glass fiber washer and by the enlarged opening 23a in the head of the stator lead 24.

We claim:

1. A disc trimmer capacitor comprising,
   a rotor having one face flat,
   a first bore normal to said flat face, an electrode spaced from said flat face and having an extension to said first bore, a shaft fixed in said first bore and electrically connected to said extension,
   a stator having one face flat and presented to the flat face of the rotor, a second bore normal to its flat face and of greater diameter than and concentric with the first bore, the opposite face of the stator being recessed to provide a socket with a shoulder surrounding and spaced radially outward of the second bore, a stator electrode on its flat face having an extension to the second bore and to said shoulder, said stator electrode engaging the flat face of the rotor,
   a stator lead having a flat head received in said socket and engaging the stator electrode extension on said shoulder and having a clearance opening surrounding and spaced radially outward from said shaft,
   a rotor lead having a flat head received in said socket and an opening centered on said shaft and of smaller diameter than the opening in the head of the stator lead, and
   a washer of insulating material on the head of said rotor terminal engaging the head of the stator lead and spacing the rotor lead from the stator lead.

2. The trimmer of claim 1 in which the stator and rotor leads have shanks and the stator has a groove for each shank extending from said socket.

3. The trimmer of claim 1 in which the rotor has a socket receiving one end of the rotor shaft and has grooves extending from said socket for receiving a tool for turning the rotor.

4. In a disc trimmer capacitor of the type having a rotor and a stator each with an electrode, the improvement which comprises a socket in the stator, rotor and stator terminals having apertured heads received in said socket in superposed relation, and means interposed between said heads for insulating the terminals from each other.

5. The trimmer of claim 4 in which the means for insulating the terminals comprises a washer of insulating material between the terminals.

6. The trimmer of claim 5 having a rotor shaft extending through the washer and both terminals.

7. The trimmer of claim 6 in which the stator terminal makes contact to its electrode through a conductor on the bottom of said socket and the rotor terminal makes contact to its electrode through said shaft.

* * * * *